United States Patent
Wu et al.

(10) Patent No.: US 11,227,231 B2
(45) Date of Patent: Jan. 18, 2022

(54) COMPUTATIONAL EFFICIENCY IN SYMBOLIC SEQUENCE ANALYTICS USING RANDOM SEQUENCE EMBEDDINGS

(71) Applicant: INTERNATIONAL BUSINESS MACHINES CORPORATION, Armonk, NY (US)

(72) Inventors: Lingfei Wu, Elmsford, NY (US); Kun Xu, Yorktown Heights, NY (US); Pin-Yu Chen, Yorktown Heights, NY (US); Chia-Yu Chen, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 930 days.

(21) Appl. No.: 15/972,108

(22) Filed: May 4, 2018

(65) Prior Publication Data
US 2019/0340542 A1 Nov. 7, 2019

(51) Int. Cl.
*G06N 20/00* (2019.01)
*G06F 16/28* (2019.01)

(52) U.S. Cl.
CPC ........... *G06N 20/00* (2019.01); *G06F 16/285* (2019.01)

(58) Field of Classification Search
None
See application file for complete search history.

(56) References Cited

U.S. PATENT DOCUMENTS 9,543,980 B2 1/2017 Huang et al.
2005/0108200 A1 5/2005 Meik et al.

FOREIGN PATENT DOCUMENTS

WO 2017/055879 A1 4/2017
WO 2017/153456 A1 9/2017

OTHER PUBLICATIONS

Anonymous, "Network Security" (2016), retrieved from the Internet: URL:https://www.open.edu/openlearn/ocw/mod/oucontent/view.php?id=2907&printable=1 [retrieved on Aug. 9, 2019]; 40 pgs.
Chen, F. et al., "PRESAGE: PRivacy-preserving gEnetic testing via SoftwAre Guard Extension"; BMC Medical Genomics (2017); vol. 10 (Suppl 2):48; 9 pgs.

(Continued)

*Primary Examiner* — David R Vincent
(74) *Attorney, Agent, or Firm* — Intelletek Law Group, PLLC; Gabriel Daniel, Esq.

(57) ABSTRACT

A method and system of analyzing a symbolic sequence is provided. Metadata of a symbolic sequence is received from a computing device of an owner. A set of R random sequences are generated based on the received metadata and sent to the computing device of the owner of the symbolic sequence for computation of a feature matrix based on the set of R random sequences and the symbolic sequence. The feature matrix is received from the computing device of the owner. Upon determining that an inner product of the feature matrix is below a threshold accuracy, the iterative process returns to generating R random sequences. Upon determining that the inner product of the feature matrix is at or above the threshold accuracy, the feature matrix is categorized based on machine learning. The categorized global feature matrix is sent to be displayed on a user interface of the computing device of the owner.

20 Claims, 13 Drawing Sheets

(56) References Cited

OTHER PUBLICATIONS

Ligier, D et al., "Privacy Preserving Data Classification using Inner-Product Functional Encryption"; Proceedings of the 3rd International Conference on Information Systems Security and Privacy (2017); 9 pgs.

International Search Report and Written Opinion from related application, PCT/EP2019/061374; 15 pgs.

Ben-Hur, A. et al., "Support Vector Machines and Kernels for Computational Biology", PloS Computational Biology (2008); vol. 4:10; pp. e1000173 (10 pgs).

Leslie, C.S. et al., "Mismatch string kernels for discriminative protein classification", Bioinformatics (2004); vol. 20:4; pp. 467-476.

Xing, Z. et al., "A Brief Survey on Sequence Classification", SIGKDD Explorations (), vol. 12:1, 9 pgs.

Saigo, H. et al., "Protein homology detection using string alignment kernels", Bioinformatics (2004); vol. 20:11; pp. 1682-1689.

Mell, P. et al., "The NIST Definition of Cloud Computing: Recommendations of the National Institute of Standards and Technology", NIST U.S Department of Commerce, NIST Special Publication 800-145, (2001) 7 pgs.

Evans, D. et al.; "Practical Secure Two-Party Computation: Techniques, Tools, and Applications"; University of Maryland & Indiana University; Aug. 2011, 26 pgs.

Anonymously; "Apparatus and Method for Multi-Source Content Federation Services in Hybrid Cloud with Classification for Business Analytics"; http://ip.com/IPCOM/000216411D; Apr. 4, 2012, 7 pgs.

Anonymously; "Apparatus and Method for Multi-Source Content Federation Services in Hybrid Cloud with Classification for Business Analytics"; http://ip.com/IPCOM/000216411D; Apr. 4, 2012, 4 pgs.

Liu, X. L. et al., "Deep Recurrent Neural Network for Protein Function Prediction from Sequence", Wyss Institute for Biologically Inspired Engineering, etc 38 pgs.

Naveed, M. et al.; "Privacy in the Genomic Era"; http://www.arxiv:1405.1891v3; Jun. 17, 2015. 43 pgs.

500

502
Input: Strings $\{x_j\}_{j=1}^{N}$, length of random string $D_j$, size of alphabet $|\Sigma|$.

504
1: if Choose RSE(RF) then
2:   Uniformly draw number $D_j$ of indices $(I_1, I_2, \ldots, I_{D_j}) = \text{randi}(|\Sigma|, 1, D_j)$
3:   Obtain random characters from $\Sigma(\{I_1, I_2, \ldots, I_{D_j}\})$
4:   Generate random string $\omega_j$ by concatenating random characters
5: else if Choose RSE(RFD) then
6:   compute the discrete distribution $h(\omega)$ for each character in alphabet $\Sigma$
7:   Draw number $D_j$ of indices $(I_1, I_2, \ldots, I_{D_j}) = \text{randi}(|\Sigma|, 1, D_j)$ from data letter distribution $h(\omega)$
8:   Obtain random characters from $\Sigma(\{I_1, I_2, \ldots, I_{D_j}\})$
9:   Generate random string $\omega_j$ by concatenating random characters
10: else if Choose RSE(SS) then
11:   Uniformly draw string index $k = \text{randi}(1, N)$ and select the $k$-th raw string
12:   Obtain length $L_k$ of the $k$-th raw string and uniformly draw letter index $l = \text{randi}(1, L_k - D_j + 1)$
13:   Generate random string $\omega_j$ from a continuous segment of $k$-th raw string starting from $l$-th letter
14: else if Choose RSE(BSS) then
15:   Uniformly draw string index $k = \text{randi}(1, N)$, select the $k$-th raw string, and obtain its length $L_k$
16:   Divide $k$-th raw string into $b = L_k / D_j$ blocks of sub-string
17:   Uniformly draw number of blocks that will be sampled $l = \text{randi}(1, b)$
18:   Uniformly draw block indices $(B_1, B_2, \ldots, B_l) = \text{randi}(b, 1, l)$
19:   Generate number $l$ of random strings $\omega_j$ by gathering all drawn blocks of sub-strings (and remove if it has in $\{\omega_j\}$)
20: end if
21: Return $\omega_j$ for all generated random strings

506
Output: Random strings $\omega_j$

FIG. 5

| Methods | RSE(RF-DF) | RSE(RF-SF) | RSE(RD-DF) | RSE(RD-SF) | RSE(SS-DF) | RSE(SS-SF) | RSE(BSS-DF) | RSE(BSS-SF) |
|---|---|---|---|---|---|---|---|---|
| Datasets | Acc⊙ | Acc⊙ | Acc⊙ | Acc⊙ | Acc⊙ | Acc⊙ | Acc⊙ | Acc⊙ |
| drug-protein | 52.57 | 51.76 | 51.22 | 49.32 | 48.50 | 53.65 | 51.49 | 52.90 |
| fold | 73.04 | 72.90 | 74.97 | 72.47 | 73.11 | 73.21 | 74.72 | 73.13 |
| superfamily | 74.03 | 73.46 | 74.67 | 70.80 | 77.46 | 77.13 | 74.82 | 75.32 |
| splice | 86.72 | 86.31 | 86.20 | 82.86 | 88.71 | 88.08 | 89.76 | 90.17 |
| dna3-class1 | 78.20 | 77.20 | 77.85 | 79.46 | 81.44 | 80.84 | 83.99 | 82.66 |
| dna3-class2 | 88.40 | 89.51 | 87.97 | 90.41 | 87.20 | 90.61 | 89.51 | 90.40 |
| dna3-class3 | 73.94 | 78.55 | 72.0 | 70.72 | 70.89 | 72.87 | 78.20 | 78.78 |
| mnist-str4 | 98.52 | 98.43 | 98.43 | 98.31 | 98.76 | 98.61 | 98.75 | 98.71 |
| mnist-str8 | 98.45 | 98.48 | 98.39 | 98.31 | 98.51 | 98.51 | 98.5 | 98.53 |

FIG. 6

| Methods | RSE (710) | | SSK (712) | | ASK (714) | | LSTM (716) | | iRNN (718) | |
|---|---|---|---|---|---|---|---|---|---|---|
| Datasets | Accu | Time | Accu | Time | Accu | Time | Accu | Time | Accu | Time |
| drug-protein | 53.65 | 54.8 | 28.72 | 3.0 | 11.92 | 20.0 | 31.33 | 576.0 | 32.90 | 210.0 |
| fold | 73.41 | 289.51 | 46.3 | 85.0 | 48.83 | 1070.0 | 68.08 | 13778.0 | 53.83 | 2452.0 |
| superfamily | 77.46 | 469.9 | 44.63 | 140.0 | 44.70 | 257.0 | 63.98 | 16778.0 | 40.41 | 4774.0 |
| splice | 90.17 | 238.9 | 71.26 | 68.0 | 71.57 | 184.0 | 86.94 | 166.0 | 89.97 | 83.2 |
| dna3-class1 | 83.39 | 1193.6 | 86.38 | 313.0 | 86.23 | 667.0 | 80.1 | 866.0 | 83.18 | 400.0 |
| dna3-class2 | 90.61 | 432.2 | 82.76 | 475.0 | 82.63 | 916.0 | 83.08 | 1080.0 | 90.03 | 286.0 |
| dna3-class3 | 78.78 | 1436.8 | 77.91 | 553.0 | 78.14 | 926.0 | 83.36 | 2400.0 | 81.68 | 870.0 |
| mnist-str4 | 98.76 | 4087.2 | -- | -- | -- | -- | 98.63 | 13090.0 | 98.50 | 8502.0 |
| mnist-str8 | 98.54 | 2010.2 | -- | -- | -- | -- | 98.61 | 14618.0 | 95.98 | 4386.0 |

FIG. 7

COMPUTATIONAL EFFICIENCY IN SYMBOLIC SEQUENCE ANALYTICS USING RANDOM SEQUENCE EMBEDDINGS

BACKGROUND

Technical Field

The present disclosure generally relates to classification of linear sequences, and more particularly, to cloud based symbolic sequence analytics of sensitive data.

Description of the Related Art

In recent years, string classification has evolved into a core learning task and has drawn considerable interest in many applications, including computational biology, text categorization, and music classification. One challenge in string data relates to there being no explicit feature in sequences. As used herein, a feature is an individual measurable property or characteristic of a phenomenon being observed. Even with advanced feature selection techniques, the dimensionality of potential features may still be high and the sequential nature of features is difficult to capture. This makes sequence classification a more challenging task than classification on feature vectors.

SUMMARY

According to various embodiments, a computing device, a non-transitory computer readable storage medium, and a method are provided for analyzing a symbolic sequence while maintaining privacy of the data. Metadata of a symbolic sequence is received from a computing device of a data owner. A set of R random sequences is generated based on the received metadata. The set of R random sequences is sent to the computing device of the data owner over the network, for computation of a feature matrix based on the set of R random sequences and the symbolic sequence. The feature matrix is received from the computing device of a data owner of the symbolic sequence. Upon determining that an inner product of the feature matrix is below a threshold accuracy, the process iterates back to generating a set of R random sequences based on the received metadata. Upon determining that the inner product of the feature matrix is at or above the threshold accuracy, the feature matrix is identified as a global feature matrix. The global feature matrix is categorized based on machine learning. The categorized global feature matrix is sent to be displayed on a user interface of the computing device of the owner.

According to other embodiments, a computing device, a non-transitory computer readable storage medium, and a method are provided for analyzing a symbolic sequence while maintaining privacy of the data. A request for data analysis is received from a computing device of an owner of a symbolic sequence. An artificial metadata is created, representing a probability distribution of an alphabet of a symbolic sequence of the computing device of the owner of the symbolic sequence. A set of R random sequences is generated based on the artificial metadata. The set of R random sequences is sent to the computing device of the symbolic sequence owner over the network for computation of a feature matrix based on the set of R random sequences and the symbolic sequence. The feature matrix is received from the computing device of the owner of the symbolic sequence. Upon determining that the feature matrix is below a threshold accuracy, the process iterates back to generating a set of R random sequences based on the artificial metadata. Upon determining that the feature matrix is at or above the threshold accuracy, the feature matrix is identified as a global feature matrix and categorized based on machine learning. The categorized global feature matrix is sent to be displayed on a user interface of the computing device of the owner of the symbolic sequence.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 5 is a second algorithm that summarizes aspects of different example sampling strategies, consistent with an illustrative embodiment.

FIG. 6 illustrates a table that provides comparisons between eight different variants of random string embeddings for classification accuracy.

FIG. 7 illustrates a table that compares classification accuracy of random string embeddings against other known methods for string classification.

DETAILED DESCRIPTION

Overview

Figure 1:
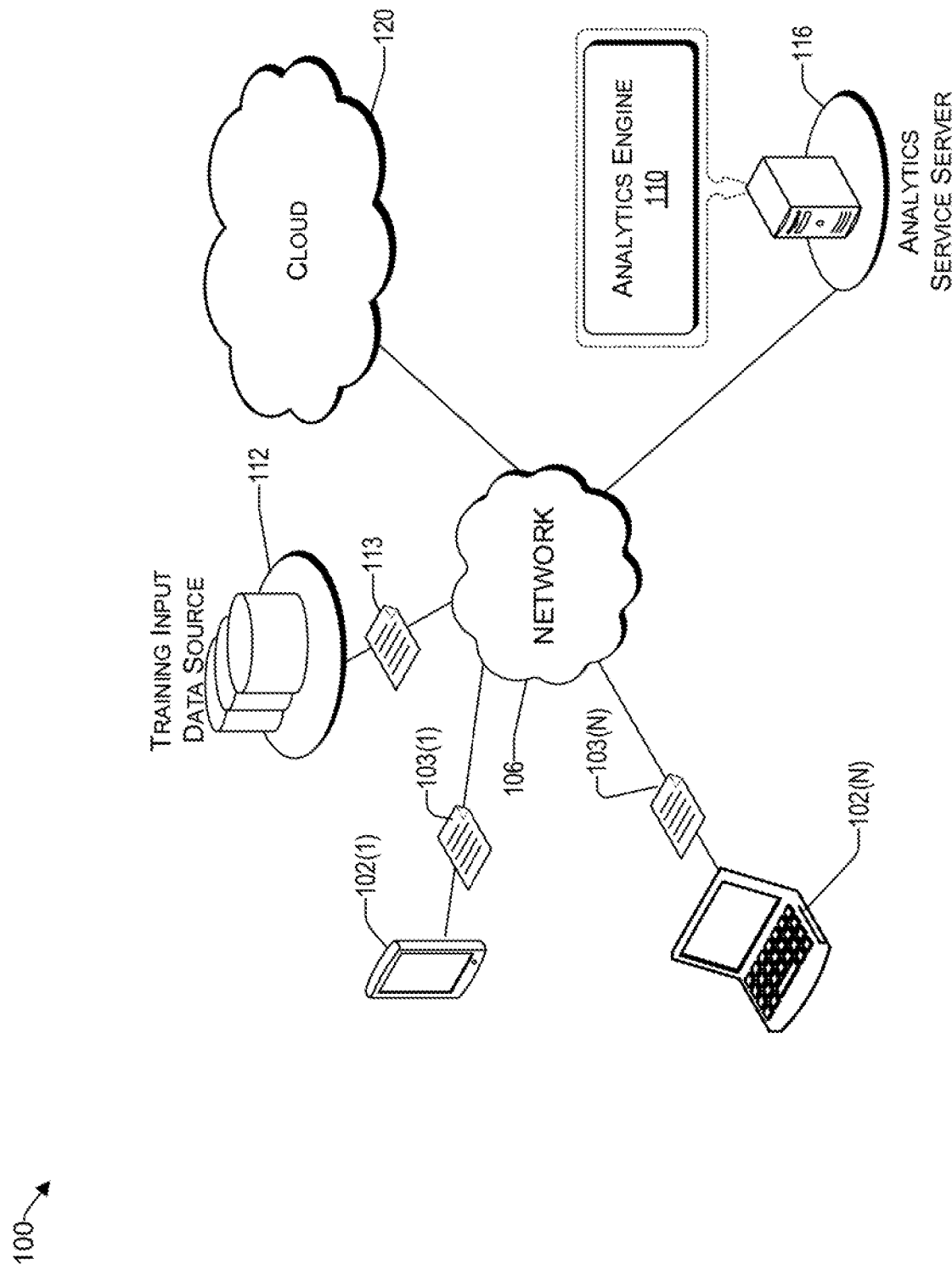
FIG. 1 illustrates an example architecture for implementing an efficient symbolic sequence analytics using random sequence embeddings.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure relates to systems and methods of cloud based symbolic sequence analytics using random sequence embeddings. String classification method is salient in various areas, including bioinformatics, health-informatics, anomaly detection, and music analysis. As used herein, a sequence is an ordered list of events. Each event can be a numerical real value, a symbolic value, a vector of real values, or a complex data type. A symbolic sequence may be an ordered list of symbols from a predetermined alphabet. For example, an amino acid (e.g., Isoleucine) has DNA codons ATT, ATC, ATA.

Existing string kernels typically (i) rely on features of short substructures in the string, which may not effectively capture long discriminative patterns, (ii) sum over too many substructures, such as all possible subsequences, which leads to diagonal dominance of the kernel matrix, or (iii) rely on non-positive-definite similarity measures derived from an edit distance. As used herein, positive definiteness relates to a mathematical property of any object to which a bilinear form or a sesquilinear form may be naturally associated, which is positive definite. While there have been efforts addressing the computational challenge regarding the length of string, such approaches typically have a quadratic complexity with respect to the number of training samples, when used in a kernel-based classifier.

In one aspect, what is presented herein is a new class of string kernels that is operative to (i) discover global properties hidden in the strings through global alignments, (ii) maintain positive-definiteness of the kernel, without introducing a diagonal dominant kernel matrix, and (iii) have a training cost linear with respect to not only the length but also the number of training samples. To this end, the proposed kernels are defined through different random feature maps, each corresponding to a distribution of random strings. Kernels defined by such feature maps can have the property of positive-definiteness and enjoy computational benefits as they produce Random String Embeddings (RSEs) that can be used directly in linear classification models.

Four different sampling strategies to generate an expressive RSE are provided herein. Applicants have identified that the random string lengths typically do not grow with respect to the length of data strings (sometimes referred to herein as a symbolic sequence), thereby reducing the computational complexity of RSE from quadratic to linear both in number of strings of the random strings and length thereof. In one aspect, there is a uniform convergence of RSE to the exact kernel with a small tolerance. The RSE scales linearly with an increase in the of number of strings (and the length of the string). The techniques described herein may be implemented in a number of ways. Example implementations are provided below with reference to the following figures.

Example Architecture

FIG. 1 illustrates an example architecture 100 for implementing an efficient symbolic sequence analytics using random sequence embeddings. Architecture 100 includes a network 106 that allows various computing devices 102(1) to 102(N) to communicate with each other, as well as other elements that are connected to the network 106, such as a training data source 112, an analytics service server 116, and the cloud 120.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. The network 106 allows the analytics engine 110, which is a software program running on the analytics service server 116, to communicate with a training data source 112, computing devices 102(1) to 102(N), and the cloud 120, to provide kernel learning. In one embodiment, the data processing is performed at least in part on the cloud 120.

For purposes of later discussion, several user devices appear in the drawing, to represent some examples of the computing devices that may be the source of symbolic sequence data that is meant to be kept private. Aspects of the symbolic sequence data (e.g., 103(1) and 103(N)) may be communicated over the network 106 with an analytics engine 110 of the analytics service server 116. Today, user devices typically take the form of portable handsets, smart-phones, tablet computers, personal digital assistants (PDAs), and smart watches, although they may be implemented in other form factors, including consumer, and business electronic devices.

For example, a computing device (e.g., 102(N)) may send a request 103(N) to the analytics engine 110 to categorize the features of the sequence data stored in the computing device 102(N), in a way that the sequence data stored in the computing device 102(N) is not revealed to the analytics engine 110. In some embodiments, there is a training data source 112 that is configured to provide training data, sometimes referred to herein as random sequences, to the analytics engine 110. In other embodiments, the random sequences are generated by the analytics service server 116 and/or by the cloud 120 in response to a trigger event.

While the training data source 112 and the analytics engine 110 are illustrated by way of example to be on different platforms, it will be understood that in various embodiments, the training data source 112 and the learning server may be combined. In other embodiments, these computing platforms may be implemented by virtual computing devices in the form of virtual machines or software containers that are hosted in a cloud 120, thereby providing an elastic architecture for processing and storage.

Example Block Diagrams

Figure 2:
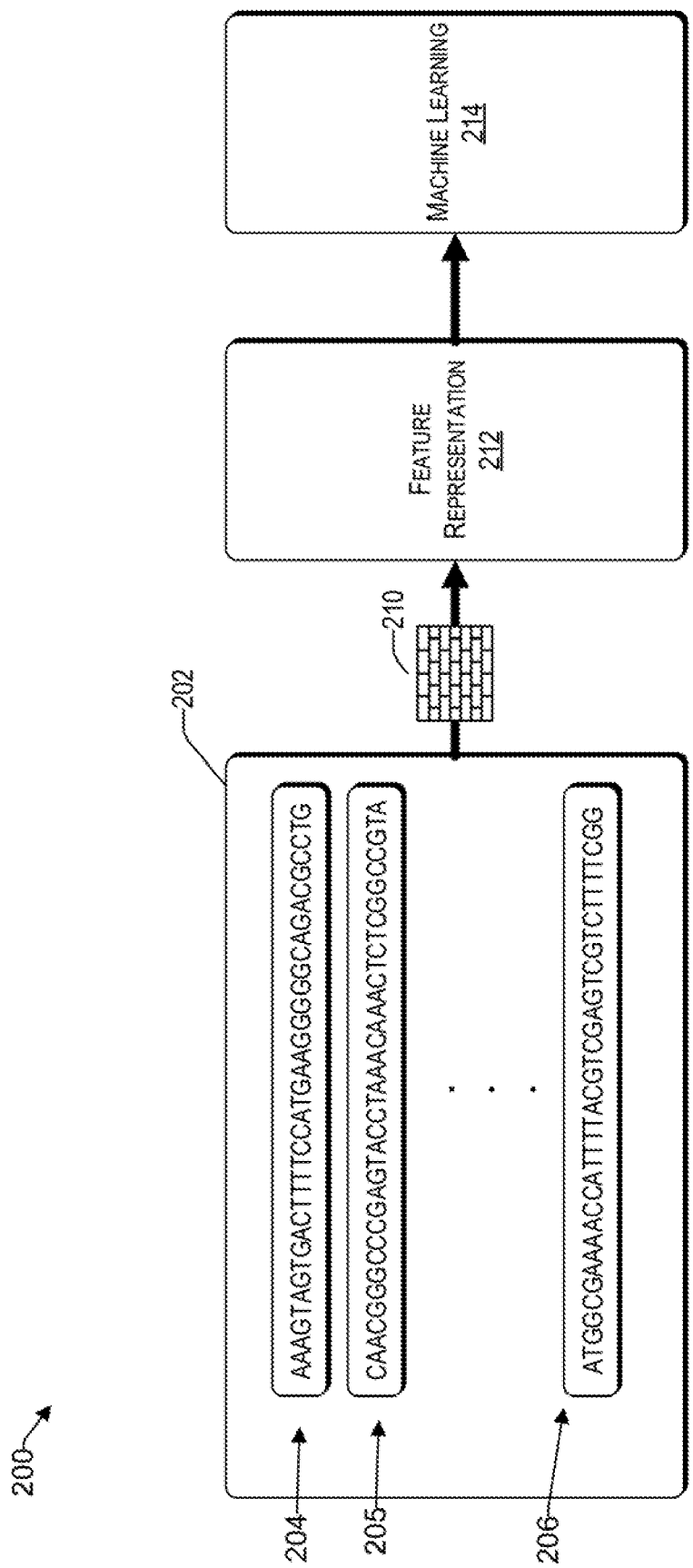
FIG. 2 is a conceptual block diagram of a system for processing sequence data, consistent with an illustrative embodiment.

One of the challenges of symbolic sequence classification, clustering, and/or error detection, collectively referred to herein as categorization, is to achieve sufficient accuracy to come to a valid conclusion about the data. In this regard, reference now is made to FIG. 2, which is a conceptual block diagram 200 of a system for the processing of sequence data, consistent with an illustrative embodiment. It is noted that a symbolic sequence may not be of fixed length and may even include different substructures, represented by the input data 202, in the example of FIG. 2. The input data 202 is represented by way of example only, and not by way of limitation, as DNA sequences 204 to 206.

Traditional advanced machine learning techniques such as support vector machine (SVM), logistic regression, neural networks, etc., may be hampered by the variable length of the input data. Accordingly, a string sequence (e.g., 204 or 206) feature representation is transformed herein into a feature representation that is compatible for machine learning 214, which may be provided by an analytics service provider, discussed in more detail later. By virtue of the feature representation 210 of a target sequence that may be of non-uniform length, the processing of information in various applications, including quantifying the similarity of DNA and protein sequences in bioinformatics, automatic spelling correction in neurolinguistics programming (NLP), anomaly detection of the sequence of a user's system, text categorization using kernel representation, etc., is facilitated.

Another challenge in symbolic sequence classification and clustering relates to data security. Indeed, many applications involve computations that involve sensitive data from two or more individuals. Today, the concern of genome data privacy resides at the crossroads of computer science, medicine, and public policy. For example, an individual may wish to compare their genome with the genomes of different groups of participants to identify an appropriate treatment. Such comparisons could have value but may be inhibited because of privacy concerns. Accordingly, in one embodiment, what is provided herein is an effective barrier 210 between the data owner and the analytics service provider, thereby obviating the need to send the raw sensitive information between the two parties.

Figure 3:
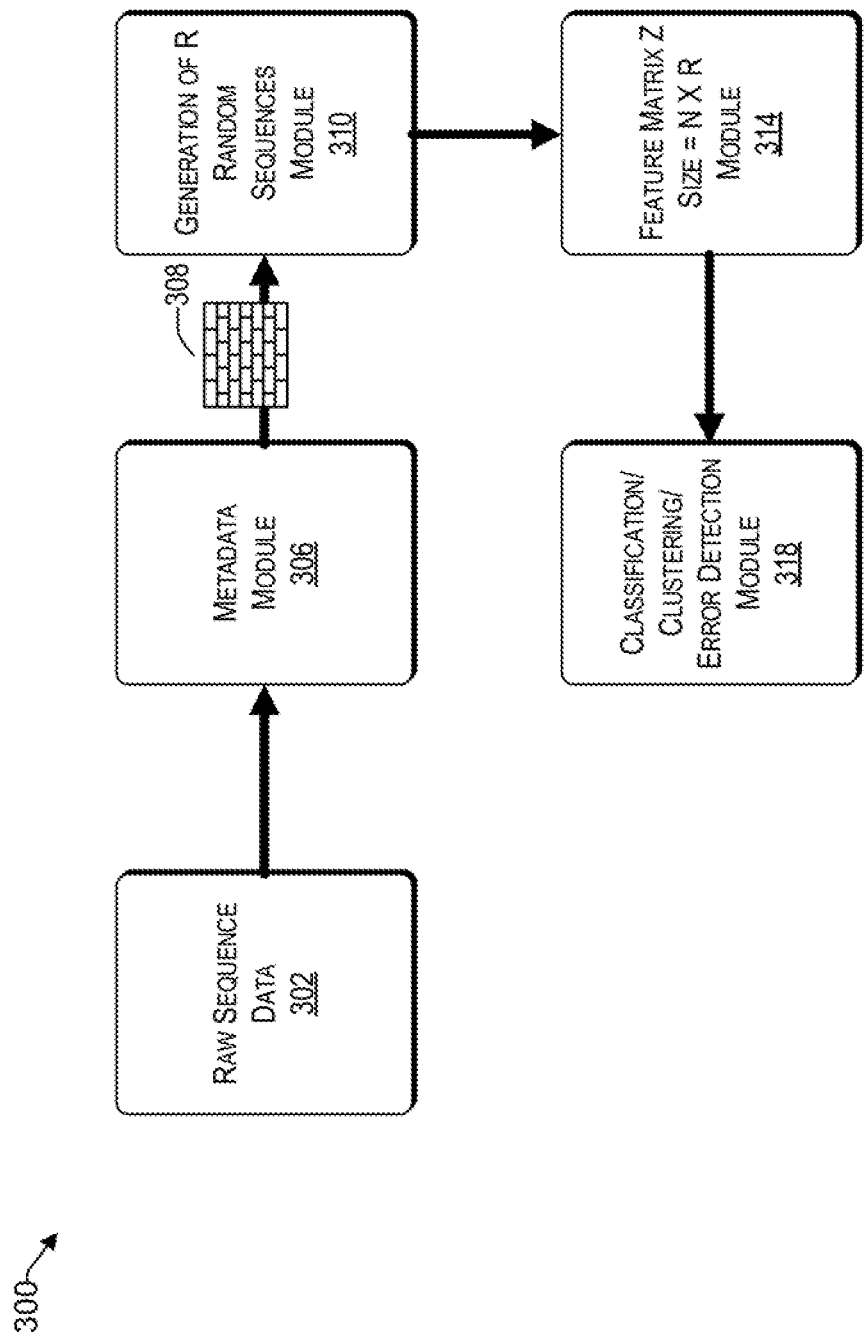
FIG. 3 is another conceptual block diagram of a system for processing sequence data, consistent with an illustrative embodiment.

Reference now is made to FIG. 3, which is a conceptual block diagram 300 of a system for processing sequence data, consistent with an illustrative embodiment. A computing device includes raw sequence data 302 that belongs to an owner. The computing device includes a metadata module 306 that is operative to perform a probability analysis of the raw sequence data, sometimes referred to herein as metadata of the raw sequence data. For example, the metadata module 306 may determine the characters (e.g., alphabet) in the sequence and determine the frequency distribution of each character of the alphabet in the raw sequence data.

The metadata is sent to an analytics engine (e.g., similar to the analytics engine 110 of FIG. 1). Notably, the raw sequence data need not be shared with the analytics engine, this notion being represented by the wall barrier 308.

The analytics engine includes a module 310 that is operative to generate R random sequences of variable length D based on the distribution of the characters received from the data owner. The R random sequences are sent to the computing device of the data owner for further processing.

The computing device of the data owner has a module 314 that is configured to compute a feature matrix for the raw sequence data by using the received R random sequences. The feature matrix Z has a size N×R, where N represents the number of strings in the raw sequence data. The generation of the random sequences by the analytics engine and subsequent creation of the feature matrix Z may be iterative until a predetermined condition, such as a predetermined number of iterations, maximum bandwidth usage, and/or desired accuracy in the categorization is obtained. For example, the iterative process continues until an inner product of the feature matrix has a threshold accuracy. Stated differently, modules 310 and 314 may operate repeatedly until a threshold accuracy is achieved. The feature matrix Z can then be used by the analytics engine to perform classification, error detection, and/or clustering via an appropriate module 318. The Kernel Matrix is $K=Z*Z^T$. The results can then be provided to an appropriate recipient, such as the computing device of the data owner.

Example String Kernel by Counting Substructures

In one approach, the kernel k(x,y) between two strings x,y∈X is computed by counting the number of shared substructures between x, y. For example, let S denote the set of indices of a particular substructure in x (e.g., subsequence, substring, or single character), and S(x) be the set of all possible such set of indices. Further, let U be all possible values (e.g., characters) of such substructure. A family of string kernels can be defined by equation 1 below:

$$k(x, y) := \sum_{u \in \mathcal{U}} \phi_u(x)\phi_u(y) \qquad \text{(Eq. 1)}$$

Where $$\phi_u(x) := \sum_{S \in \mathcal{S}} 1_u(x[S])\gamma(S)$$

is a number of substructures in x of value u, weighted by γ(S), which reduces the count according to properties of S, such as length.

For example, in a vanilla text kernel, S denotes word positions in a document x, and U denote the vocabulary set (with γ(S)=1).

One concern regarding a substructure-counting kernel is the diagonally dominance, where the diagonal elements of a kernel Gram matrix is significantly (e.g., often orders of magnitude) larger than the off-diagonal elements, providing an almost identity kernel matrix. This is because a string shares a large number of common substructures with itself, and the issue is more profound for problem solving over more substructures in S.

Example Edit-Distance Substitution Kernel

In one approach string kernels are defined by using the edit distance (sometimes referred to as the Levenshtein Distance). For example, let d(i,j) denote the Levenshtein Distance (LD) between two substrings d(x[1:i],y[1:j]). The distance can be recursively defined as follows:

$$d(i, j) = \begin{cases} \max\{i, j\} & , i = 0 \text{ or } j = 0 \\ \min\begin{cases} d(i-1, j) + 1, \\ d(i, j-1) + 1, \\ d(i-1, j-1) + 1_{x[i] \neq y[j]} \end{cases} & , \text{o.w.} \end{cases} \qquad \text{(Eq. 2)}$$

Accordingly, the distance in equation 2 above provides the minimum number of edits (i.e., insertion, deletion, or substitution) to transform x into y. The distance measure is known as a metric, that is, it satisfies (i) d(x,y)≥0, (ii) d(x1,y)=d(y, x), (iii) d(x,y)=0⟺x=y and (iv) d(x,y)+d(y, x3)≥d(x, x3). The distance-substitution kernel replaces the Euclidean distance in a typical kernel function by a new distance d(x,y). For example, for Gaussian and Laplacian Radial basis function (RBF) kernels, the distance substitution provides the following:

$$k_{Gauss}(x,y) := \exp(-\gamma d(x,y)^2) \qquad \text{(Eq. 3)}$$

$$k_{Lap}(x,y) := \exp(-\gamma d(x,y)) \qquad \text{(Eq. 4)}$$

One concern with equations 3 and 4 above is that they are not positive-definite (p.d.) for edit distance. Accordingly, the use of the kernels represented by equations 3 and 4 in a kernel method, such as support vector machine (SVM), does not correspond to a loss minimization problem, and the numerical procedure may not converge to an optimal solution as the non-positive-definite kernel matrix yields a non-convex optimization problem.

Example Determination of String Kernel from Edit Distance

In one embodiment, classification of a symbolic sequence is by way of a sequence distance (sometimes referred to as an edit distance) determination. A distance function is used to measure the similarity between two sequences. Upon determining the distance function, classification methods can be applied. To that end, a string kernel can use the edit distance to establish positive definiteness.

For example, consider strings of bounded length L, that is, $X \in \Sigma^L$. Let $\Omega \in \Sigma_L$ also be a domain of strings and $p(\omega): \Omega \to R$ be a probability distribution over a collection of random strings $\omega \in \Omega$. The proposed kernel is defined as by equation 5 below:

$$k(x,y) := \int_{w \in \Omega} p(\omega) \phi_\omega(x) \phi_\omega(y) d\omega \quad (\text{Eq. 5})$$

Where expression $\Phi\omega$ is a feature function that transforms the input sequences x into the feature value with respect to a collection of random strings w.

The expression $\omega$ can be set directly to the distance provided by equation 6 below:

$$\phi_\omega(x) := d(x,\omega) \quad (\text{Eq. 6})$$

Alternatively, the expression $\Phi\omega$ can be converted into a similarity measure via the transform provided by equation 7 below:

$$\phi_\omega(x) := \exp(-\gamma d(x,\omega)) \quad (\text{Eq. 7})$$

In the latter scenario, the distance $\Phi\omega$ can be interpreted as a soft distance substitution kernel. Instead of substituting the "distance" into the function, equation 3 substitutes a "soft version" of the kernel, as provided by equation 8 below:

$$k(x,y) = \exp(-\gamma \text{softmin}_{p(\omega)}\{d(x,\omega)+d(\omega,y)\}) \quad (\text{Eq. 8})$$

Where:

$$\text{softmin}_{p(\omega)}(f(\omega)) := -\frac{1}{\gamma} \log \int p(\omega) e^{-\gamma f(\omega)} d\omega.$$

Suppose $\Omega$ only includes strings of non-zero probability (i.e. $p(\omega) > 0$). We note the following:

$$\text{softmin}_{p(\omega)}(f(\omega)) \to \min_{\omega \in \Omega} f(\omega) \text{ as } \gamma \to \infty \quad (\text{Eq. 9})$$

Further, as long as $X \subseteq \Omega$, we have the following expression by triangular inequality:

$$\min_{\omega \in \Omega} d(x, \omega) + d(y, \omega) = d(x, y) \quad (\text{Eq. 10})$$

Accordingly, as $\gamma \to \infty$:

$$k(x,y) \to \exp(-\gamma d(x,y)) \quad (\text{Eq. 11})$$

Equation 11 above allows comparison between the kernel of equation 8 and the distance-substitution kernel of equation 4 (in the limiting case). It is noted that unlike the distance-substitution kernel of equation 4, the novel kernel of equation 8 is always positive definite by its definition, as provided in the context of equation 5, due to the expression below:

$$\int_x \int_y \int_{\omega \in \Omega} p(\omega) \phi_\omega(x) \phi_\omega(y) d\omega xy = \int_{\omega \in \Omega} p(\omega)(\sim_x \phi_\omega(x) dx)$$
$$(\int_y \phi_\omega(y) dy) d\omega \geq 0 \quad (\text{Eq. 12})$$

Example Efficient Computation of Random String Embedding (RSE)

Although the kernels of equations 6 and 7 have been defined, it may be helpful to provide a simple analytic form of solution to the kernel of equation 5. The following random feature (RF) approximations can be used to determine a kernel:

$$\hat{k}_R(x, y) \approx \langle Z(x), Z(y) \rangle = \frac{1}{R} \sum_{i=1}^{R} \langle \phi_{\omega_i}(x), \phi_{\omega_i}(y) \rangle \quad (\text{Eq. 13})$$

For example, the feature vector Z(x) is computed using dissimilarity measure $\phi(\{\omega_i\}_{i=1}^{R}, x)$ where $\{\omega_i\}_{i=1}^{R}$ is a set of random strings of variable length D drawn from a distribution $p(\omega)$. In particular, the function $\phi$ could be any edit distance measure or converted similarity measure that considers global properties through alignments. Without loss of generality we consider LD as our distance measure. The random approximation is referred to herein as random string embedding (RSE).

Figure 4:
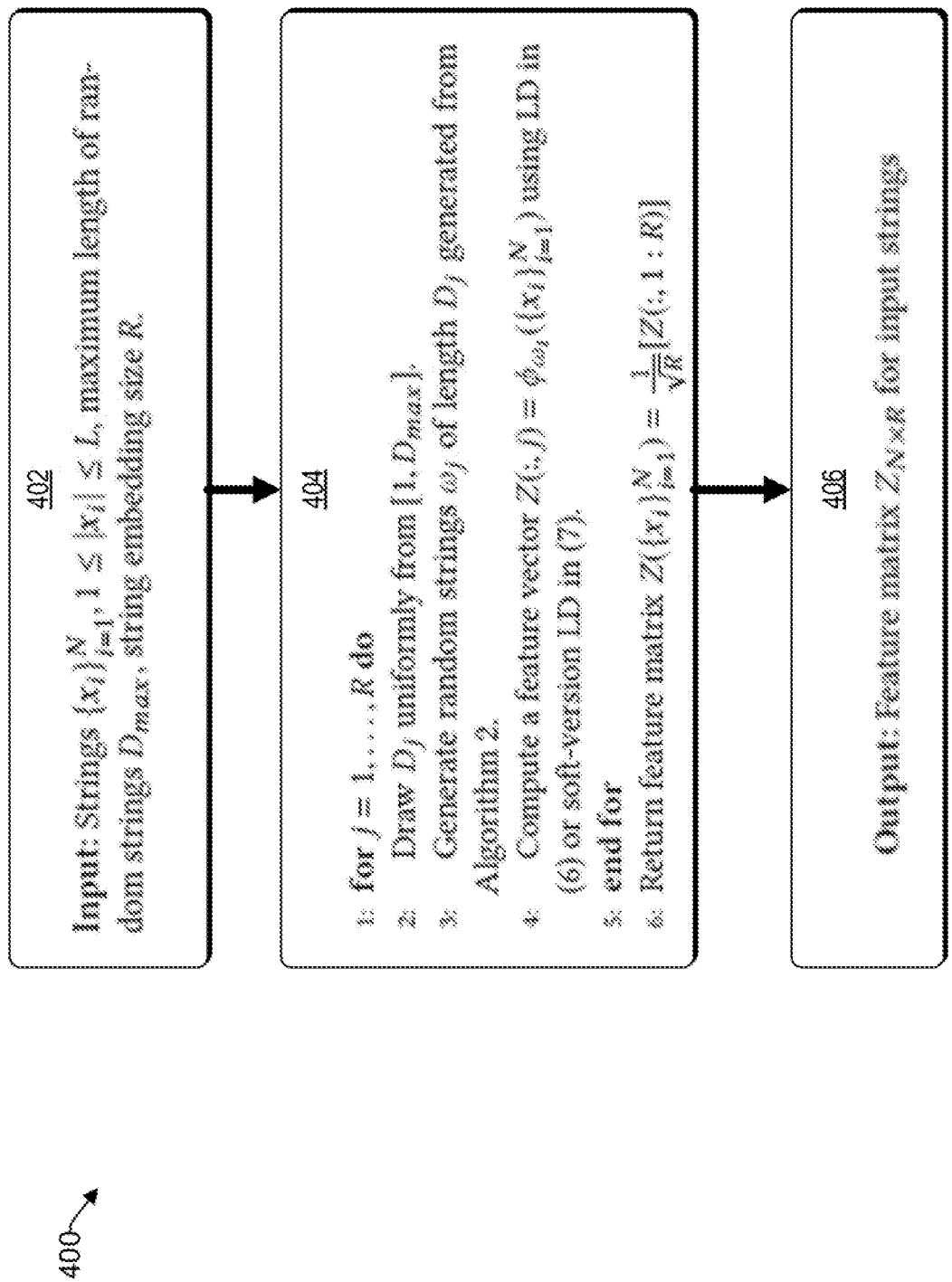
FIG. 4 is an algorithm of an unsupervised feature generation that is used for random string embeddings, consistent with an illustrative embodiment.

Reference now is made to FIG. 4, which is an algorithm 400 of an unsupervised feature generation that is used for an RSE, consistent with an illustrative embodiment. An input 402 may be characterized by the following expression:

$$\{x_i\}_{i=1}^{N}, 1 \leq |x_i| \leq L, \quad (\text{Eq. 14})$$

Where L is the length of the string of the original sequences, $x_i$ is a symbolic sequence (i.e., input string), and N is a number of input strings.

The maximum length of the random strings is Dmax, having a string embedding size R (feature matrix). It is noted that R is also the number of random sequences. The output 406 is a feature matrix having a size $Z_{N \times R}$. By virtue of the RSE of FIG. 4 being an unsupervised feature generation method for embedding strings, it provides flexibility to be used with various machine learning tasks, in addition to classification. The hyperparameter Dmax is for both the kernels of equations 6 and 7. The hyperparameter γ is for the kernel of equation 7 using "soft-version" LD distance as features. For example, the role of the maximum length of the random string Dmax is to capture the longest segments of the original strings that correspond to the highly discriminative features embedded in the data. Applicants have identified in experiments that these long segments are particularly salient for capturing the global properties of the strings having a long length (e.g., L>1000).

In some scenarios, there may be no prior knowledge about the value of D (i.e., length of the string of the random sequences) and thus we sample each random string of D in the range [1, Dmax] to yield an unbiased estimation. In some embodiments, D is a constant. Applicants have identified that a value of 30 or smaller is ideal for D because it provides a good balance between resolution and calculation complexity. Further, in order to learn an expressive representation, generating a set of random strings of high-quality is appropriate, which is discussed in more detail in a subsequent section.

One aspect about the RSE method discussed herein relates to the fact that the RSE scales linearly both in the number of strings and in the length of strings. It is noted that a typical evaluation of the LD between two data strings is $O(L^2)$ provided that the two data strings have approximately equal length L. With our RSE, we can dramatically reduce the computational cost of LD to O(LD), where D is treated as constant in the algorithm 400 of FIG. 4. This improvement in computational efficiency is particularly salient when the length of the original strings, sometimes referred to herein as the symbolic sequence, is long. It will be understood that the length of the sequence depends on its application. For example, a protein sequence can have a length of 100 to 10,000 or even longer.

For example, most of popular existing string kernels also have quadratic complexity in terms of number of strings, rendering the scale of large data to be impractical. In contrast, the RSE discussed herein reduces the complexity from quadratic to linear in terms of number of samples, by virtue of embedding a matrix instead of constructing a full kernel matrix. Accordingly, in one embodiment, the total computational complexity of the RSE discussed herein is O(NRL), if D is treated as a constant, independent of the size of the alphabet.

A factor to the effectiveness of the RSE is how to generate a set of random strings of high quality. In this regard four different sampling strategies are discussed herein to provide a rich feature space derived from both data-independent and data-dependent distributions. In this regard, FIG. 5 is an algorithm 500 (i.e., second algorithm), which summarizes aspects of different example sampling strategies, consistent with an illustrative embodiment. The input 502, can be characterized in a way similar to that of equation 14 above. The output 506 comprises random strings $\omega_i$.

The first sampling strategy is based on an RF method, where the distribution associated to the predefined kernel function is found. However, since the kernel function is defined by an explicit distribution, there is the flexibility to use any suitable distribution that may accommodate the sequence data. To this end, in one embodiment, a uniform distribution is used to represent the true distribution of the characters in a subject alphabet of the sequence data. This sampling approach is referred to herein as RSE(RF).

In another embodiment, reflecting a second sampling strategy, instead of using an existing distribution, histograms of each character are computed for the subject alphabet that appears in the data strings (i.e., sequence data). The learned histograms are a biased estimate for the true probability distribution. We call this sampling scheme RSE(RFD). These two sampling strategies essentially consider how to generate a random string from low-level characters of a corresponding alphabet. A data-dependent distribution can yield better generalization error.

Accordingly, the above two data-dependent sampling approaches discussed herein are configured to generate random strings. In one embodiment (i.e., third approach), unlike known techniques that use the whole data sequence, which may lead to large generalization errors, segments (e.g., substrings) of variable length are sampled from the original strings. Too long or too short sub-strings could either carry noise or insufficient information about the true data distributions. Therefore, the length of random strings is sampled uniformly. We call this sampling approach RSE (SS).

In one embodiment, in order to sample more random strings in one sampling period, we also divide the original string into several blocks of sub-strings and uniformly sample some number of these blocks as our random strings. Note that in this embodiment (i.e., fourth approach), we sample multiple random strings and we do not concatenate them as one long string. This approach facilitates the learning of more discriminative features at the cost of more computation when the original strings and random strings are compared using LD. We can this approach RSE(BSS).

Convergence Analysis

In one embodiment, since the kernel depicted in equation 5 above does not have an analytic form but only a sampling approximation, as provided in equation 13, it would be relevant to know how many random features are appropriated in equation 13 to have an accurate approximation. It would also be relevant to know whether such accuracy generalizes to strings beyond the training data. We answer those questions through a theorem provided in equation 15 below.

$$\Delta_R(x,y):=\tilde{k}_R(x,y)-k(x,y) \quad \text{(Eq. 15)}$$

The $\Delta R(x,y)$ represents the difference between the exact kernel of equation 5 and its random-feature approximation of equation 13 with R samples. $K_R(x,y)$ is the inner product of the feature matrix. The uniform convergence is provided by equation 16 below:

$$P\{\max_{x,y \in X} |\Delta_R(x,y)| > t\} \leq 8e^{2L \log |\Sigma| - Rt^2/2} \quad \text{(Eq. 16)}$$

Where L is a bound on the length of strings in X, and $|\Sigma|$ is size of the alphabet.

Accordingly, to provide $|\Delta R(x,y)| < \epsilon$ with a probability of at least 1−δ, it suffices to have the following number of random sequences R:

$$R = \Omega\left(\frac{L \log |\Sigma|}{\epsilon^2} \log\left(\frac{\gamma}{\epsilon}\right) + \frac{1}{\epsilon^2} \log\left(\frac{1}{\delta}\right)\right) \quad \text{(Eq. 17)}$$

Thus, theorem 1 explains that for any two strings $x,y \in X$, one can provide a kernel approximation of error less than c as long as R≥L log($|\Sigma|$)/ε2 up to the logarithmic factor.

Example Variants of the RSE

As discussed above, there are two different global string kernels and four different random string generation approaches, resulting in eight different combinations of RSE. In this regard, FIG. 6 illustrates a table that provides comparisons between these eight different variants of RSE for classification accuracy.

The RSE(RF-DF) variant 610 combines Random Features using predefined distribution of each character to generate random strings with direct LD distance as provided in equation 6. The RSE(RF-SF) variant 612 combines Random Features using predefined distribution of each character to generate random strings with a soft version of LD distance as provided in equation 7. The RSE(RFD-DF) variant 614 is similar to the RSE(RF-DF) 610 variant, in that it computes the distribution of each character from the dataset for generating random strings and uses direct LD distance as features in equation 6. The RSE(RFD-SF) variant 616 is similar to RSE(RF-SF) variant 612, in that it computes the distribution of each character from the dataset for generating random strings and uses a soft version of the LD distance as features in equation 7.

The RSE(SS-DF) variant 618 combines the data-dependent sub-strings generated from the dataset with direct LD distance as features in equation 6. The RSE(SS-SF) variant 620 combines the data-dependent sub-strings generated from the dataset with a soft LD distance as features in equation 7. The RSE(BSS-DF) variant 622 is similar to the RSE(SS-DF) variant 618, in that it generates blocks of sub-strings from data-dependent distribution and uses direct LD distance as features in equation 6. The RSE(BSS-SF) variant 624 is similar to the RSE(SS-SF) variant 620, in that it generates blocks of sub-strings from data-dependent distribution and uses a soft-version LD distance as features in equation 7.

Reference now is made to FIG. 7 which illustrates a table 700 that compares classification accuracy of RSE against other known methods for string classification. The known methods include a subsystem string kernel (SSK) 712, approximate mismatch string kernel (ASK) 714, long short-term memory (LSTM) 716, and a simple but elegant solution using RNN comprising rectified linear units (iRNN) 718. It should be noted that a "-" in table 700 indicates that SSK and ASK methods run out of memory (in an example system having 512G on a workstation).

Significantly, table 700 indicates that the RSE approach 710 discussed herein can outperform or match the baselines 712 to 718 in terms of classification accuracy, while using less computation time for achieving the same or better accuracy. For example, the RSE approach 710 performs substantially better than SSK 712 and ASK 714, often by a large margin, (i.e., RSE 710 achieves 25%-33% higher accuracy than SSK 712 and ASK 714 on three protein datasets). This is because (k,m)—mismatch string kernel is sensitive to the strings of long length, which often causes the feature space size of the short sub-strings (k-mers) to grow exponentially and leads to a diagonal dominance problem.

More importantly, using only small sub-strings extracted from the original strings results in an inherently local perspective and may fail to capture the global properties of strings. Further, in order to achieving the same accuracy, the runtime of RSE 710 can be significantly less than that of SSK 712 and ASK 714. For instance, for the dataset super-family, RSE 710 can achieve an accuracy of 46.56% using only 3.7 seconds while SSK 712 and ASK 714 achieve similar accuracy 44.63% and 44.79% using 140.0 and 257.0 seconds, respectively.

Further, table 700 indicates that RSE 710 achieves better accuracy than LSTM 716 and iRNN 718 on seven out of the nine total datasets (e.g., except on dna3-class3 and mnist-str8). It is noted that table 700 includes the best accuracy of both models (i.e., LSTM 716 and iRNN 718) on testing dataset directly, which may explain why they exhibit favorable numbers on mnist-str8. LSTM 716 generally has a better performance compared to iRNN at the cost of more expensive computations since the model parameters of LSTM 716 are much larger than iRNN 718. However, both of these models often take substantially more time than RSE while achieving lower classification accuracy, highlighting the effectiveness and efficiency of our the RSE 710 discussed herein.

Example Scalability of RSE

A challenge encountered by traditional symbolic sequence classification and clustering systems is scalability. For example, the distance function, such as edit distance (sometimes referred to as Levenshtein Distance) may be used in traditional systems to compute the distance or similarity score of different symbolic sequences. However, such approaches are computationally involved and thus, not computationally efficient on the computing device(s) performing the calculations.

Figures 8A, 8B:
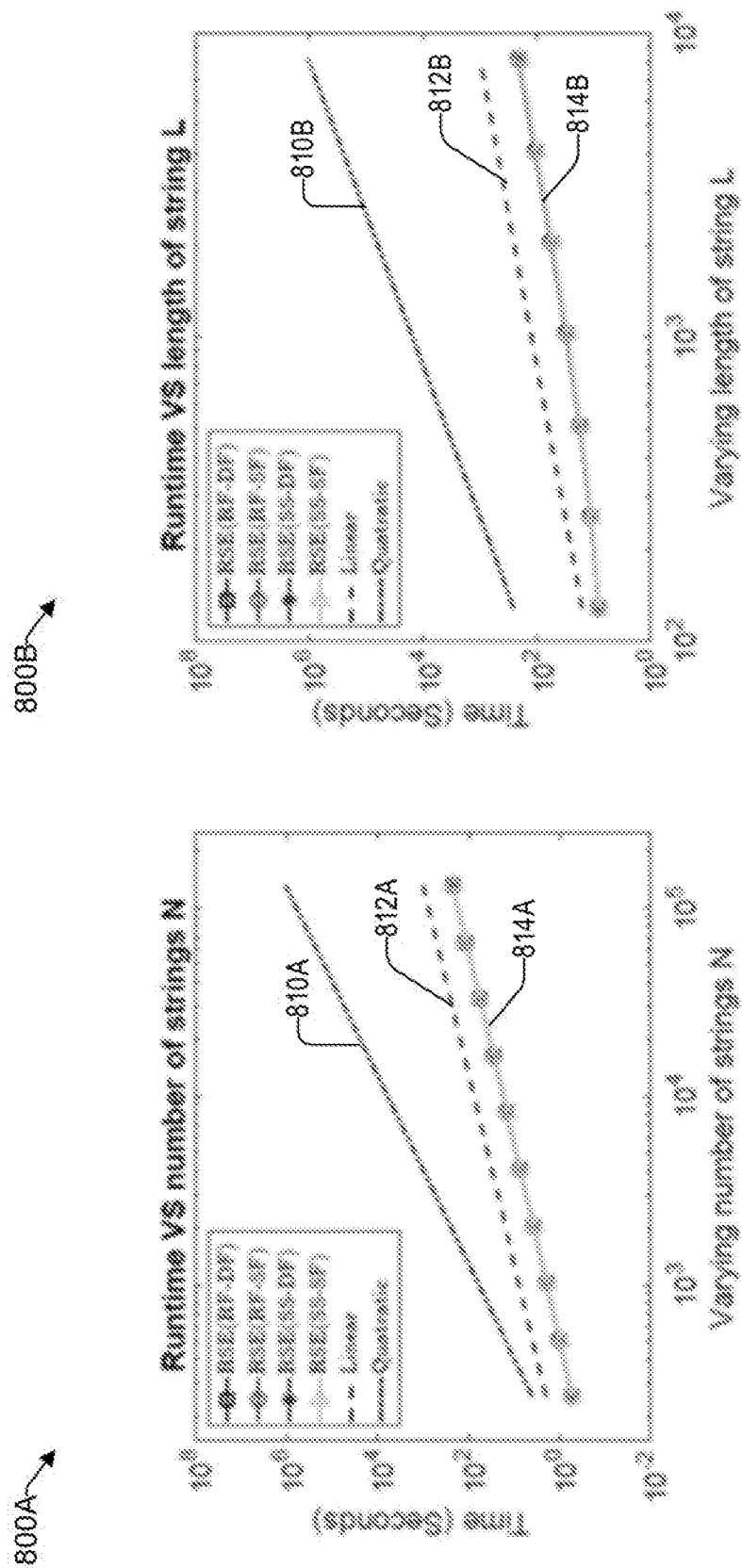
FIGS. 8A and 8B. illustrate the scalability of a random string embedding by varying a number of strings N and a length of the strings L, respectively, on a randomly generated string dataset.

Accordingly, in one aspect, the RSE discussed herein scales linearly when increasing the number of strings N. In this regard, FIGS. 8A and 8B illustrate the scalability of RSE by varying a number strings N and a length of the strings L, respectively, on a randomly generated string dataset. In this experiment, the number of strings is changed in the range of N=[128, 131072] and the length of a string in the range of L=[128, 8192], respectively. When generating a random string dataset, its alphabet is chosen to be the same as its protein strings. Further, Dmax=10 and R=256 for the hyperparameters related to RSE. FIGS. 8A and 8B provide the runtime for computing string embeddings using four variants of our method RSE in 814A and 814B.

As illustrated in FIG. 8A, RSE scales linearly when increasing the number of strings N, which confirms our prior computational analysis. Second, FIG. 8B empirically corroborates that RSE also achieves linear scalability in terms of the length of string L. Accordingly, the RSE derived from the string kernel discussed herein scales linearly in both the number of string samples and the length of the strings. This facilitates developing a new family of string kernels that enjoy both higher accuracy and linear scalability on real-world large-scale string data.

Example Process

Figure 9:
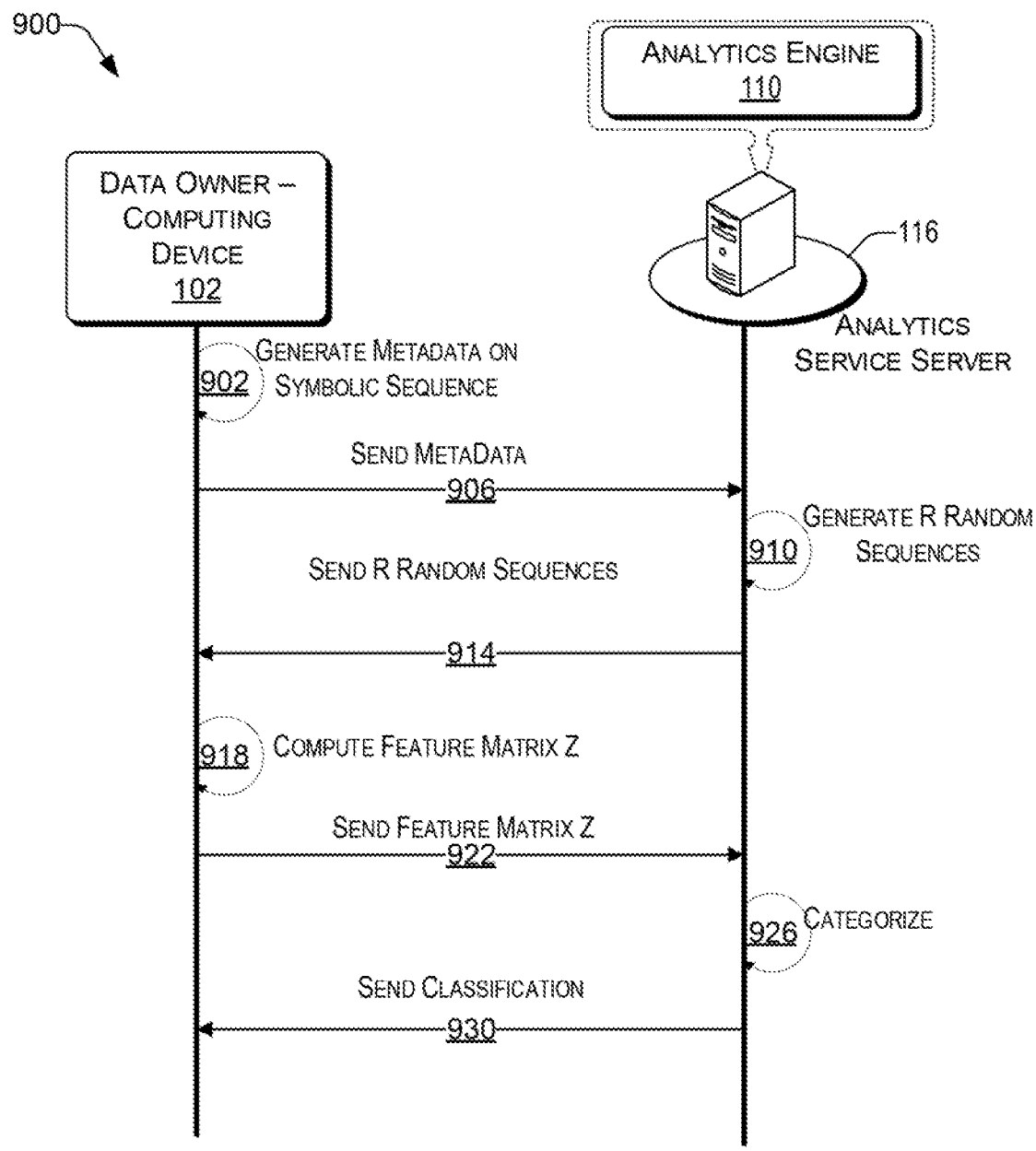
FIG. 9 presents a call flow process for an efficient symbolic sequence analytics using random sequence embeddings, consistent with an illustrative embodiment.
Figure 10:
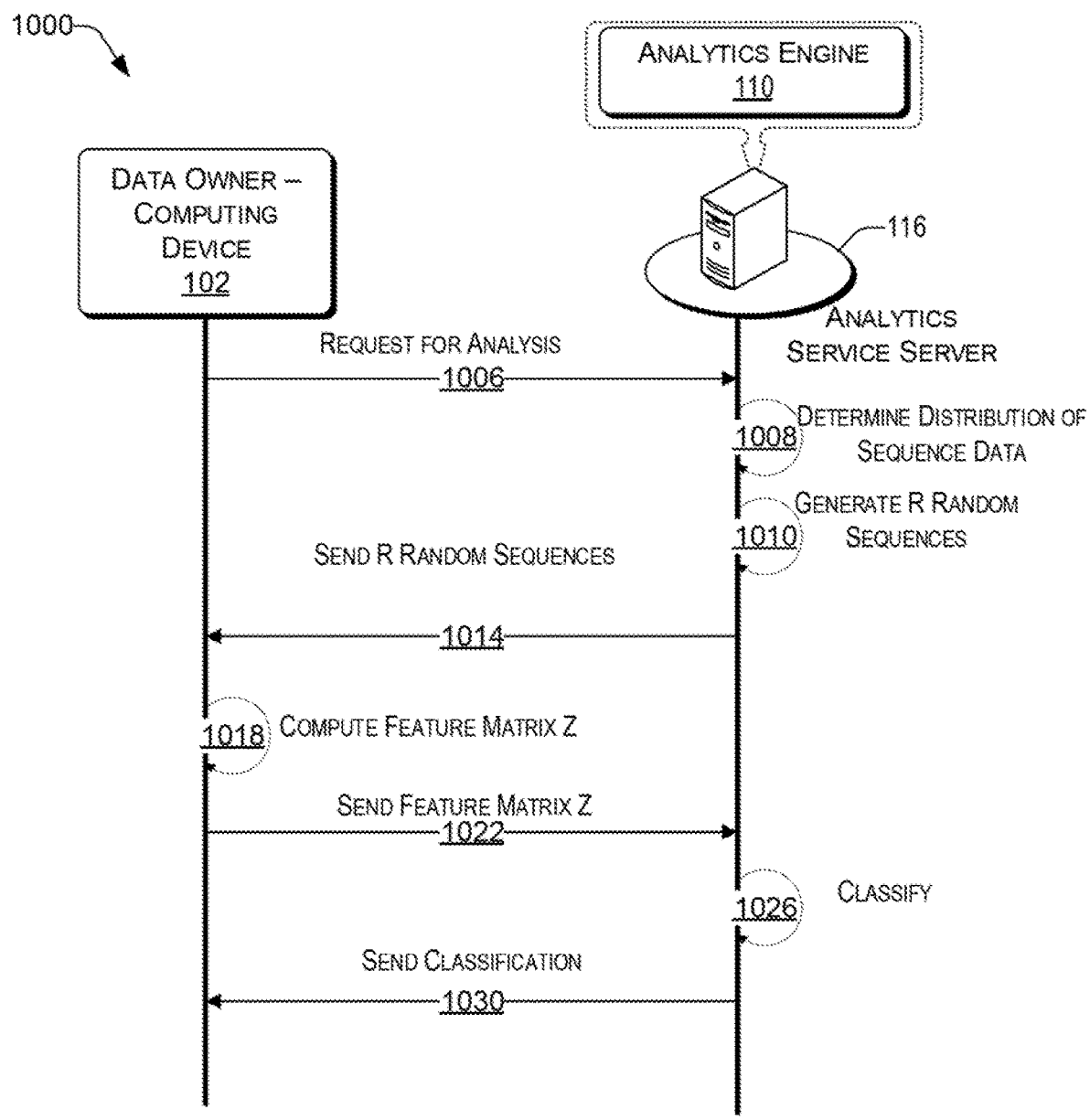
FIG. 10 is a process flow where the data owner does not provide metadata to the analytics engine, consistent with an illustrative embodiment.

With the foregoing overview of the example architecture 100, block diagrams, and analysis approaches, it may be helpful now to consider a high-level discussion of example processes. To that end, FIGS. 9 and 10 present call flow processes 900 and 1000, respectively, for an efficient symbolic sequence analytics using random sequence embeddings, consistent with illustrative embodiments.

Call flows 900 and 1000 are illustrated as a collection of processes in logical flowcharts, wherein each represents a sequence of operations that can be implemented in hardware, software, or a combination thereof. In the context of software, the processes represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described processes can be combined in any order and/or performed in parallel to implement the process. For discussion purposes, the processes 900 and 1000 are described with reference to the architecture 100 of FIG. 1.

At step 902, the owner of the symbolic sequence (i.e., computing device of the data owner 102) creates metadata based on the raw symbolic sequence. In one embodiment, the metadata comprises a probability distribution of characters (e.g., alphabet) of the raw symbolic sequence.

At step 906, the analytics engine 110 of the analytics service server 116 receives the metadata of the symbolic sequence from the computing device 102 of the data owner. In one embodiment, the metadata is stored in a repository of the analytics server.

At step 910, the analytics engine 110 generates R random sequences based on the received metadata. For example, the set of R random sequences can be based on the probability distribution of the characters of the sequence. In one embodiment, generating the R random sequences based on the received meta information includes, for each of the R random sequences, uniformly sampling a length D of the random sequence to capture an alignment of the raw symbolic sequence. The length D of each random sequence R is from Dmin to Dmax, where Dmin.

At step 914, the R random sequences are sent to the computing device of the data owner 102 for further processing.

At step 918, the computing device 102 determines a feature matrix Z based on the received R random sequences. For example, the computing device 102 may determine the feature matrix by way of a Levenshtein Distance (LD) between the random sequence and the raw symbolic sequence.

At step 922, the analytics engine 110 receives the feature matrix Z from the computing device 102.

At step 926, the analytics engine 110 determines the accuracy of the feature matrix Z received from the computing device 102. If the feature matrix Z is below a threshold accuracy, steps 910 to 922 are repeated. This iterative process continues until the analytics engine 110 determines that the received feature matrix is at or above a threshold accuracy. Upon determining that the threshold accuracy is achieved, the feature matrix is identified as a global feature matrix and categorized using various machine learning techniques. In various embodiments, the machine learning can be unsupervised or semi-supervised. As used herein, categorization includes at least one of: classification, clustering, and anomaly detection via machine learning.

At step 930, the classified global feature matrix is sent to the computing device 102 of the data owner, where the results can be displayed on a user interface thereof.

Reference now is made to FIG. 10, which is a process flow 1000 where the data owner does not provide metadata to the analytics engine, consistent with an illustrative embodiment. Instead, at step 1006, the owner of the symbolic sequence (i.e., computing device of the data owner 102) sends a request for data analysis to the analytics engine 110 of the analytics service server 116.

At step 1008, the analytics engine 110 determines a random distribution to represent the sequence data of the data owner 102. In one embodiment, the distribution is a uniform distribution. Stated differently, an artificial distribution representing the probability distribution of the characters of the raw symbolic sequence of the data owner is created, referred to herein as artificial metadata.

At step 1010, the analytics engine 110 generates R random sequences based on the artificial metadata. For example, the set of R random sequences can be based on the probability distribution of the characters of the sequence provided in the artificial metadata. The length D of each random sequence is from Dmin to Dmax, where Dmin is ≥1 and Dmax≤20.

At step 1014, the R random sequences are sent to the computing device of the data owner 102 for further processing.

At step 1018, the computing device 102 determines a feature matrix Z based on the received R random sequences. For example, the computing device 102 may determine the feature matrix by way of a Levenshtein Distance (LD) between the random sequence and the raw symbolic sequence.

At step 1022, the analytics engine 110 receives the feature matrix Z from the computing device 102.

At step 1026, the analytics engine 110 determines the accuracy of the feature matrix Z received from the computing device 102. If the feature matrix Z is below a threshold accuracy, steps 1008 to 1022 are repeated. This iterative process continues until the analytics engine 110 determines that the received feature matrix is at or above a threshold accuracy. Upon determining that the threshold accuracy is achieved, the feature matrix is identified as a global feature matrix and categorized using various machine learning techniques.

At step 1030, the classified global feature matrix is sent to the computing device 102 of the data owner.

By virtue of the systems and processes discussed herein, the privacy of the raw symbolic sequence data is preserved through a two-party system. The memory consumption related to the computation of the kernel matrix can be reduced from $O(NL+N^2)$ to $O(NR)$, $R \ll N$. Furthermore, the computational complexity of computing a kernel or similarity matrix can be significantly reduced. For example, the edit distance can be reduced from $O(N^2L^2)$ to $O(NRLD)$, $R \ll N$, $D \ll L$. Still further, various machine learning classifiers and clustering techniques based on learned feature representation can be used, thereby achieving improved performance with respect to known classification techniques.

Example Computer Platform

Figure 11:
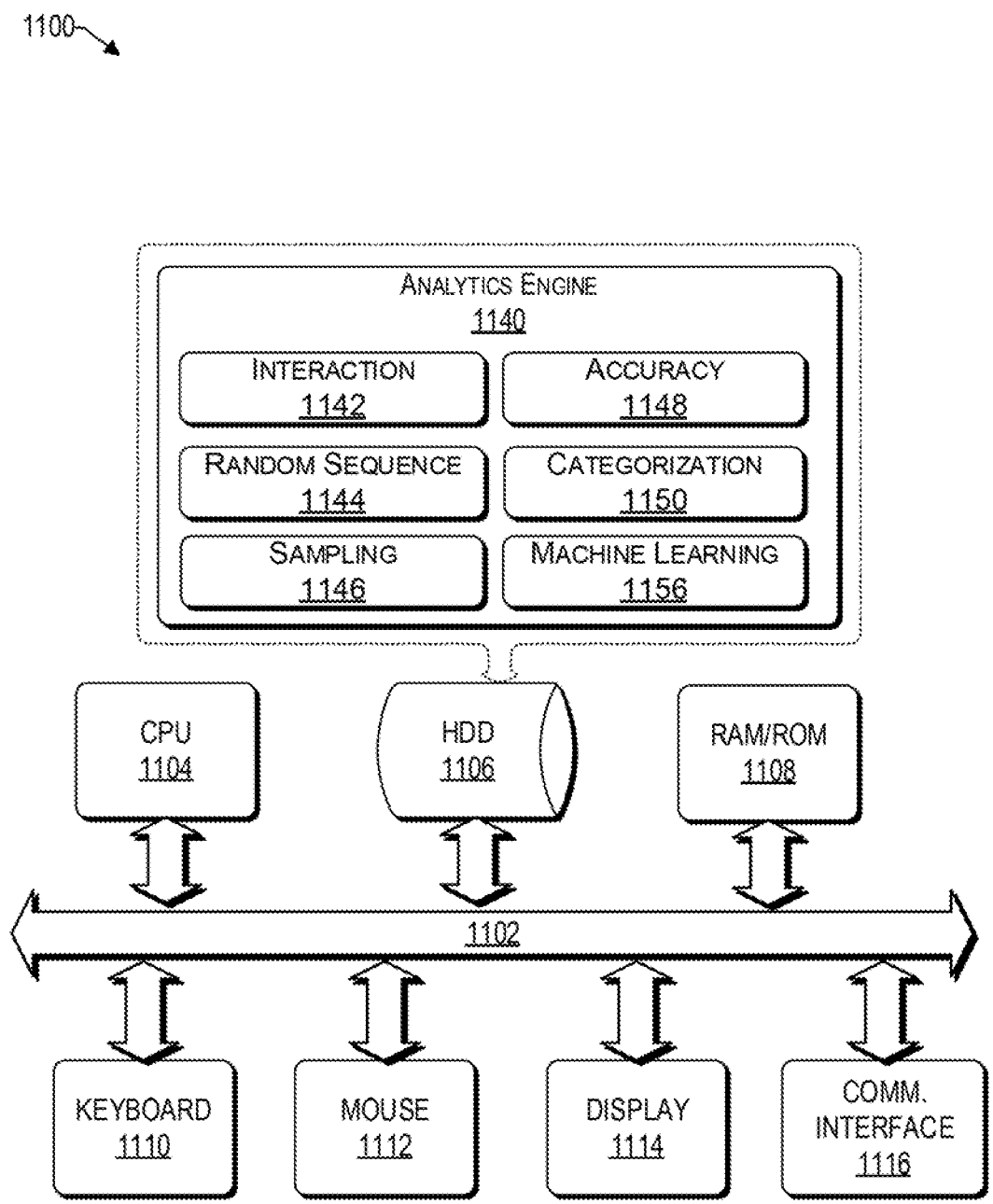
FIG. 11 is a functional block diagram illustration of a computer hardware platform that can communicate with various networked components.

As discussed above, functions relating to an efficient symbolic sequence analytics using random sequence embeddings can be performed with the use of one or more computing devices connected for data communication via wireless or wired communication, as shown in FIG. 1. FIG. 11 is a functional block diagram illustration of a computer hardware platform that can communicate with various networked components, such as a training input data source, the cloud, etc. In particular, FIG. 11 illustrates a network or host computer platform 1100, as may be used to implement a server, such as the analytics service server 116 of FIG. 1.

The computer platform 1100 may include a central processing unit (CPU) 1104, a hard disk drive (HDD) 1106, random access memory (RAM) and/or read only memory (ROM) 1108, a keyboard 1110, a mouse 1112, a display 1114, and a communication interface 1116, which are connected to a system bus 1102.

In one embodiment, the HDD 1106, has capabilities that include storing a program that can execute various processes, such as the analytics engine 1140, in a manner described herein. The analytics engine 1140 may have various modules configured to perform different functions. For example, there may be an interaction module 1142 that is operative to interact with one or more computing devices to receive data, such as metadata, feature matrices, and requests from owners of sequence data. The interaction module 1142 may be also be operative to receive training data from the training data source, as discussed herein.

In one embodiment, there is random sequence module 1144 operative to generate R random sequences based on metadata provided by a computing device of an owner of data, or artificial metadata generated by the analytics engine or from the training input data source.

In one embodiment, there is a sampling module 1146 operative to sample each random string of D in the range [1, Dmax] to yield an unbiased estimation of each random string D, while conserving computational resources.

In one embodiment, there is an accuracy module 1148 operative to determine the accuracy of a feature matrix Z received from the computing device of a data owner. If the feature matrix Z is below a threshold accuracy, then an iterative process continues until the accuracy module 148 of the analytics engine 1140 determines that the received feature matrix is at or above a threshold accuracy.

In one embodiment, there is a categorization module 1150 operative to perform at least one of (i) classification, (ii) clustering, and (iii) anomaly detection, based on the determined feature matrix.

In one embodiment, there is a machine learning module 1156 operative to perform one or more machine learning techniques, such as support vector machine (SVM), logistic regression, neural networks, and the like, on the determined feature matrix.

In one embodiment, a program, such as Apache™, can be stored for operating the system as a Web server. In one embodiment, the HDD 1106 can store an executing application that includes one or more library software modules, such as those for the Java™ Runtime Environment program for realizing a JVM (Java™ virtual machine).

Example Cloud Platform

As discussed above, functions relating to an for an efficient symbolic sequence analytics using random sequence embeddings, may include a cloud 200 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
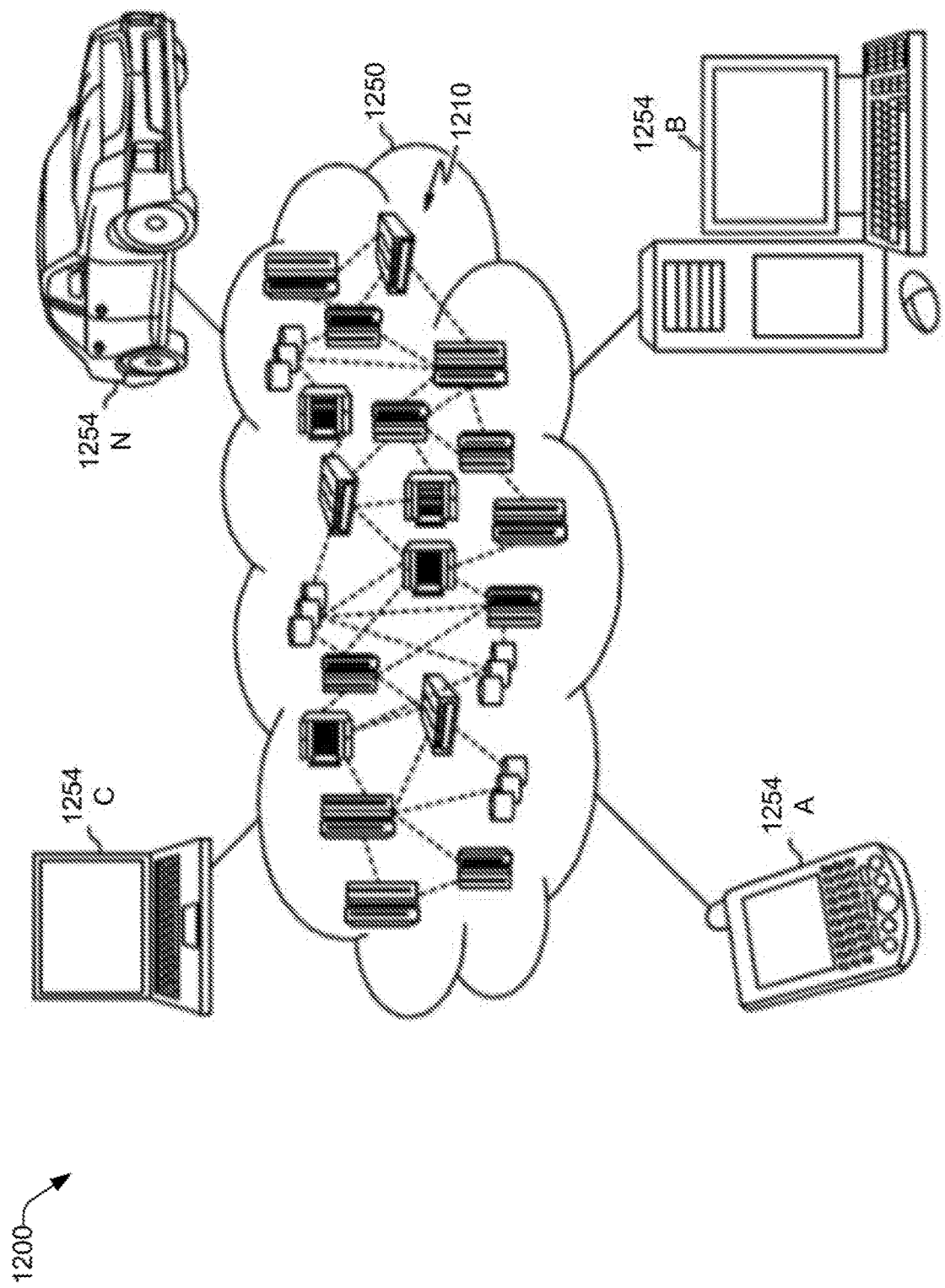
FIG. 12 depicts a cloud computing environment, consistent with an illustrative embodiment.

Referring now to FIG. 12, an illustrative cloud computing environment 1200 is depicted. As shown, cloud computing environment 1200 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
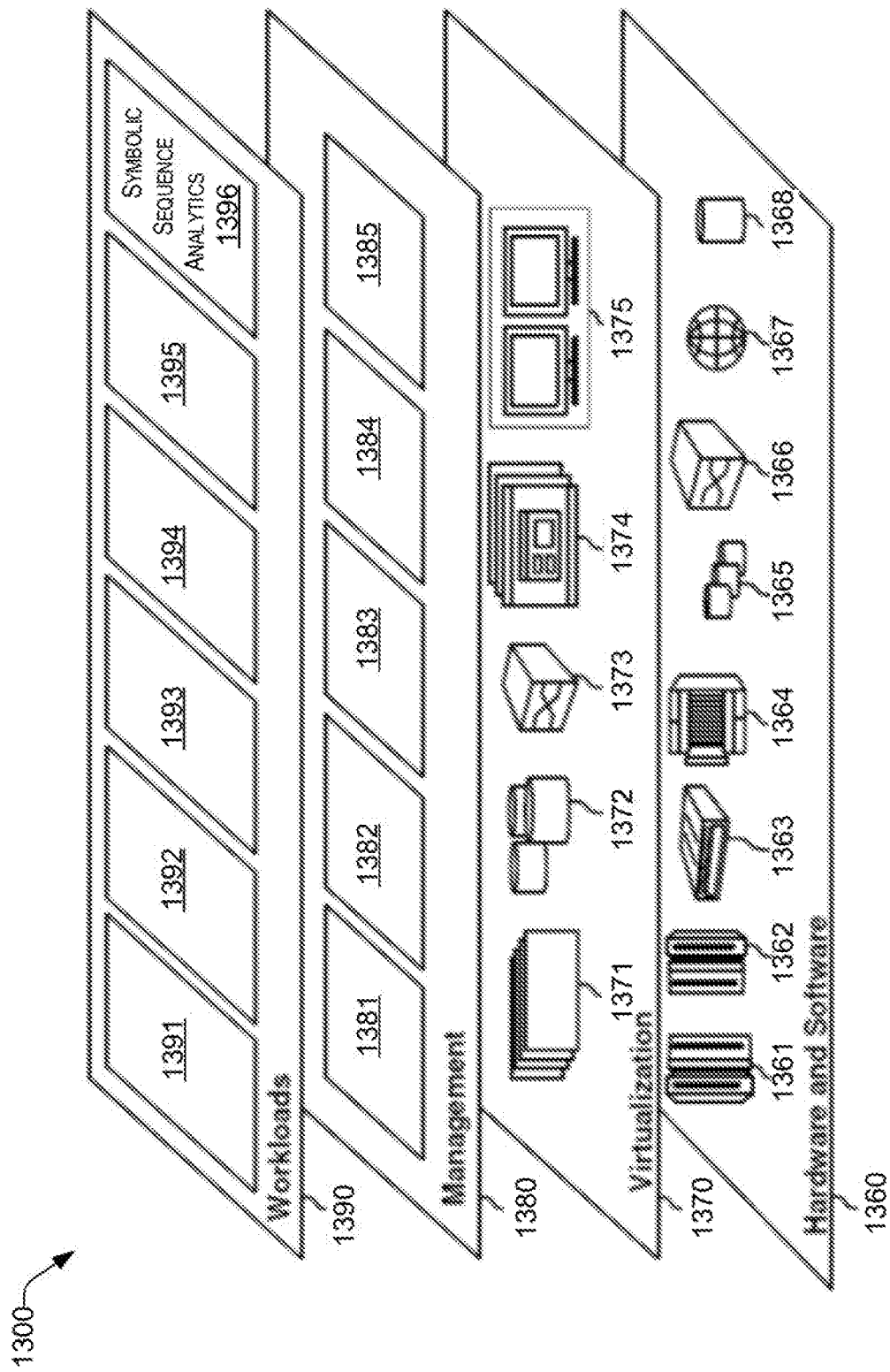
FIG. 13 depicts abstraction model layers, consistent with an illustrative embodiment.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the disclosure are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and symbolic sequence analytics 1396, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a storage device coupled to the processor;
   an analytics engine stored in the storage device, wherein an execution of the analytics engine by the processor configures the computing device to perform acts comprising:
   a) receiving metadata of a symbolic sequence from a computing device of an owner of the symbolic sequence;
   b) generating a set of R random sequences based on the received metadata;
   c) sending the set of R random sequences to the computing device of the owner of the symbolic sequence over the network for computation of a feature matrix based on the set of R random sequences and the symbolic sequence;
   d) receiving the feature matrix from the computing device of the owner of the symbolic sequence;
   e) upon determining that an inner product of the feature matrix is below a threshold accuracy, returning to act b;
   f) upon determining that an inner product of the feature matrix is at or above the threshold accuracy:
   identifying the feature matrix as a global feature matrix;
   categorizing the global feature matrix based on machine learning; and
   sending the categorized global feature matrix to be displayed on a user interface of the computing device of the owner of the symbolic sequence.

2. The computing device of claim 1, wherein the metadata comprises a probability distribution of an alphabet of the symbolic sequence.

3. The computing device of claim 2, wherein the set of R random sequences is based on the probability distribution of the sequence alphabet.

4. The computing device of claim 2, wherein the length D of each random sequence is from a Dmin to a Dmax, where the Dmin is >1 and Dmax <20.

5. The computing device of claim 1, wherein:
   generating the set of R random sequences based on the received metadata comprises, for each of the R random sequences: sampling a length D of the random sequence uniformly to reduce a volume of data to be processed by the processor; and
   sending the set of R random sequences consists of the sampled length D of the random sequence.

6. The computing device of claim 1, wherein the categorization of the global feature matrix comprises at least one of: classification, clustering, and anomaly detection.

7. The computing device of claim 1, wherein the symbolic sequence is kept private from the computing device of the analytics engine.

8. The computing device of claim 1, wherein the global feature matrix maintains positive-definiteness of a kernel without introducing a diagonal dominant kernel matrix.

9. The computing device of claim 1, wherein the categorization of the global feature matrix has a machine learning training cost linear with respect to a length and a number of training samples.

10. A computing device comprising:
a processor;
a network interface coupled to the processor to enable communication over a network;
a storage device coupled to the processor;
an analytics engine stored in the storage device, wherein an execution of the analytics engine by the processor configures the computing device to perform acts comprising:
 a) receiving a request for data analysis from a computing device of an owner of a symbolic sequence;
 b) creating artificial metadata representing a probability distribution of an alphabet of a symbolic sequence of the computing device of the owner of the symbolic sequence;
 c) generating a set of R random sequences based on the artificial metadata;
 d) sending the set of R random sequences to the computing device of the symbolic sequence owner over the network for computation of a feature matrix based on the set of R random sequences and the symbolic sequence;
 e) receiving the feature matrix from the computing device of the owner of the symbolic sequence;
 f) upon determining that an inner product of the feature matrix is below a threshold accuracy, returning to act c;
 g) upon determining that the inner product of the feature matrix is at or above the threshold accuracy:
  identifying the feature matrix as a global feature matrix;
  categorizing the global feature matrix based on machine learning; and
  sending the categorized global feature matrix to be displayed on a user interface of the computing device of the owner of the symbolic sequence.

11. The computing device of claim 10, wherein:
generating the set of R random sequences based on the artificial metadata comprises, for each of the R random sequences: sampling a length D of the random sequence uniformly to reduce a volume of data to be processed by the processor; and
sending the set of R random sequences consists of the sampled length D of the random sequence.

12. The computing device of claim 10, wherein the categorization of the global feature matrix comprises at least one of: classification, clustering, and anomaly detection.

13. The computing device of claim 10, wherein the symbolic sequence is kept private from the computing device of the analytics engine.

14. The computing device of claim 10, wherein the global feature matrix maintains positive-definiteness of a kernel without introducing a diagonal dominant kernel matrix.

15. The computing device of claim 10, wherein the categorization of the global feature matrix has a machine learning training cost linear with respect to a length and a number of training samples.

16. A non-transitory computer readable storage medium tangibly embodying a computer readable program code having computer readable instructions that, when executed, causes a computer device to carry out a method of analyzing a symbolic sequence, the method comprising:
 a) receiving metadata of a symbolic sequence from a computing device of an owner of the symbolic sequence;
 b) generating a set of R random sequences based on the received metadata;
 c) sending the set of R random sequences to the computing device of the owner of the symbolic sequence for computation of a feature matrix based on the set of R random sequences and the symbolic sequence;
 d) receiving the feature matrix from the computing device of the owner of the symbolic sequence;
 e) upon determining that an inner product of the feature matrix is below a threshold accuracy, returning to act b;
 f) upon determining that the inner product of the feature matrix is at or above the threshold accuracy:
  identifying the feature matrix as a global feature matrix;
  categorizing the global feature matrix based on machine learning; and
  sending the categorized global feature matrix to be displayed on a user interface of the computing device of the owner of the symbolic sequence.

17. The non-transitory computer readable storage medium of claim 16, wherein:
the metadata comprises a probability distribution of an alphabet of the symbolic sequence; and
the set of R random sequences is based on the probability distribution of the sequence alphabet.

18. The non-transitory computer readable storage medium of claim 16, wherein:
generating the set of R random sequences based on the received metadata comprises, for each of the R random sequences: sampling a length D of the random sequence uniformly to reduce a volume of data to be processed by the processor; and
sending the set of R random sequences consists of the sampled length D of the random sequence.

19. The non-transitory computer readable storage medium of claim 16, wherein the categorization of the global feature matrix comprises at least one of: classification, clustering, and anomaly detection.

20. The non-transitory computer readable storage medium of claim 16, wherein the symbolic sequence is kept private from the computing device of the analytics engine.

* * * * *